United States Patent [19]

Hopkins

[11] E Patent Number: Re. 31,949

[45] Reissued Date of Patent: Jul. 16, 1985

[54] GAS INSULATED TRANSMISSION LINE INCLUDING PROVISIONS FOR MINIMIZING PARTICLE GENERATION

[75] Inventor: Melvyn D. Hopkins, Grafton, Mass.

[73] Assignee: Westinghouse Electric Corp., Pittsburgh, Pa.

[21] Appl. No.: 620,407

[22] Filed: Jun. 14, 1984

Related U.S. Patent Documents

Reissue of:

[64] Patent No.: 4,335,267
Issued: Jun. 15, 1982
Appl. No.: 88,740
Filed: Oct. 26, 1979

[51] Int. Cl.[3] ..... H01B 9/06

[52] U.S. Cl. ..... 174/14 R; 174/28; 174/99 B

[58] Field of Search ..... 174/10, 14 R, 16 B, 174/27, 28, 99 R, 99 B, 138 F; 339/36

[56] References Cited

U.S. PATENT DOCUMENTS

| | | | |
|---|---|---|---|
| 1,122,130 | 12/1914 | Lamson | 138/113 |
| 1,175,885 | 3/1916 | Grabler | 16/40 X |
| 1,274,165 | 7/1918 | Hormes | 16/19 |
| 2,531,658 | 11/1950 | Walsh | 138/108 X |
| 2,706,496 | 4/1955 | Bond | 248/55 |
| 2,812,200 | 11/1957 | Yeargan | 403/12 |
| 3,361,870 | 1/1968 | Mowell et al. | 138/113 X |
| 3,361,870 | 1/1968 | Whitehead | 174/27 X |
| 3,515,939 | 6/1970 | Trump | 174/14 R X |
| 3,725,567 | 4/1973 | Olsen et al. | 174/16 B |
| 3,739,074 | 6/1973 | Floessel | 174/16 B X |
| 3,786,379 | 1/1974 | Lutchansky | 138/113 X |
| 4,084,064 | 4/1978 | Bowman | 174/14 R |
| 4,085,807 | 4/1978 | Bolin | 174/28 X |
| 4,182,378 | 1/1980 | Dieter | 138/112 |

FOREIGN PATENT DOCUMENTS

| | | | |
|---|---|---|---|
| 142511 | 3/1935 | Austria | 174/99 R |
| 2340077 | 2/1975 | Fed. Rep. of Germany | 138/113 |
| 547889 | 5/1977 | U.S.S.R. | 174/99 R |

*Primary Examiner*—Laramie E. Askin
*Attorney, Agent, or Firm*—Michael S. Yatsko

[57] ABSTRACT

A gas-insulated transmission line includes a cylindrical outer sheath, an inner conductor within the outer sheath, an insulating gas, and support insulators for insulatably supporting the inner conductor within the outer sheath. The support insulators have a pair of circumferentially spaced apart openings therein, and a wheel assembly is disposed within each of the support insulator openings. Each wheel assembly includes a rotatable wheel which extends outwardly of the support insulator opening and contacts the outer sheath. With such an arrangement, insertion or movement of the inner conductor within the outer sheath is done on wheels instead of with a sliding motion to thereby minimize the generation of conducting contamination particles. Also disclosed is the use of a removable, insulating contact button cover which prevents the particle trap ring contact from sliding against the outer sheath while the inner conductor is being assembled within the outer sheath, but which is removed after the inner conductor is in place so as to allow electric contact to the outer sheath.

11 Claims, 6 Drawing Figures

GAS INSULATED TRANSMISSION LINE INCLUDING PROVISIONS FOR MINIMIZING PARTICLE GENERATION

Matter enclosed in heavy brackets [ ] appears in the original patent but forms no part of this reissue specification; matter printed in italics indicates the additions made by reissue.

BACKGROUND OF THE INVENTION

This invention relates generally to gas insulated equipment, and more particularly to a wheel-mounted insulator for use in gas-insulated transmission lines.

Compressed gas-insulated transmission lines typically comprise a hollow, cylindrical outer sheath, an inner conductor disposed within, but spaced apart from, the outer sheath, a plurality of insulating spacers which support the conductor in the sheath, and a compressed gas such as sulfur hexafluoride or the like in the sheath to electrically insulate the conductor from the sheath.

One problem occurring in the use of gas-insulated transmission lines concerns the mobile conducting or semi-conducting particle. These particles can cause problems in that they may lower the dielectric strength of the insulating gas and may initiate flash-over and break-down of the gas as they travel between the outer sheath and the inner conductor. Trump, in U.S. Pat. No. 3,515,938, disclosed a means for deactivating and eliminating the deleterious effects of such conducting particles. In that patent, there is described the use of electrodes placed within the outer sheath to create low field regions which trap and deactivate the particles. However advantageous these particle traps may be, it is still desirable to minimize the generation of such contamination particles to the extent possible. Thus, for example, assembly of the transmission line at the manufacturing site typically occurs in stages which includes, finally, assembly in a "clean room". However, even utilizing such precautions, it is not possible to eliminate all sources of contamination particles. In particular, in a typical gas-insulated transmission line, the support insulators which space the inner conductor from the outer sheath must extend outwardly to the outer sheath to provide the necessary support. There is thus a location where the support insulator must come in contact with the outer sheath. During assembly of the transmission line, this contact point must slide along the outer sheath in order to enable the inner conductor, with its insulators, to be inserted within the outer sheath. During such insertion, the abrasion of the support insulators against the outer sheath may generate contamination particles. The prior art minimized such generation by utilizing polytetrafluoroethylene pads at the ends of the support insulators where the insulators contacted in the outer sheath to facilitate the insertion while minimizing the abrasive forces therebetween. However, even utilizing such means, contamination particles were still generated. As another example, to provide for thermal expansion and contraction, the support insulators are not fixedly secured to the outer sheath but are allowed to slide relative thereto during actual use of the transmission line. During such expansion or contraction, the sliding of the support insulators against the outer sheath can also generate contamination particles. Thus, it is desirable to provide some means for minimizing the abrasive forces between the support insulators and the outer sheath to minimize the generation of contamination particles.

SUMMARY OF THE INVENTION

In accordance with this invention, it has been found that a more desirable gas-insulated transmission line is provided which includes a cylindrical outer sheath, an inner conductor disposed within the outer sheath, an insulating gas which electrically insulates the inner conductor from the outer sheath, and support means which are utilized for insulatably supporting the inner conductor within the outer sheath. The support means includes circumferentially spaced apart openings in which are inserted wheel assemblies. Each wheel assembly includes a rotatable wheel which extends outwardly of the openings and contacts the outer sheath, thereby minimizing the abrasive forces existing between the motion of the support insulator and the outer sheath.

BRIEF DESCRIPTION OF THE DRAWINGS

Reference is now made to the description of the preferred embodiment, illustrated in the accompanying drawings, in which.

DESCRIPTION OF THE PREFERRED EMBODIMENT

Figure 1:
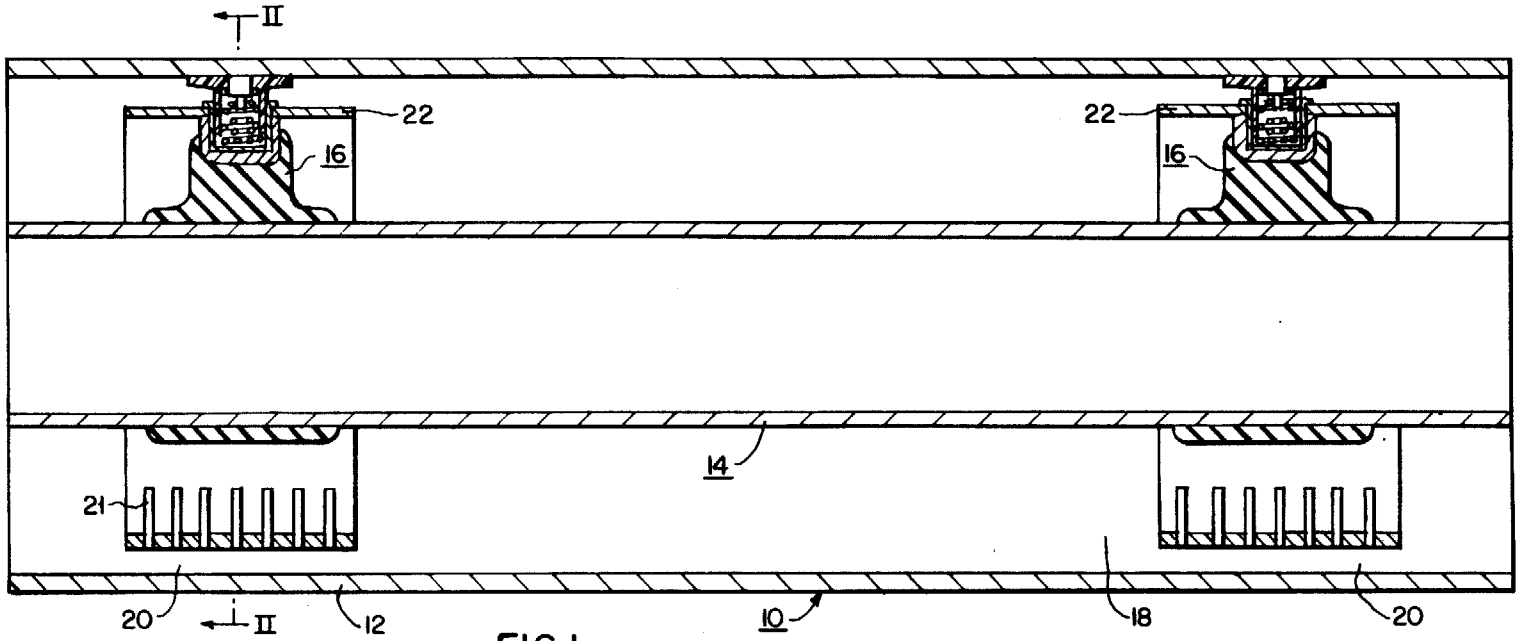
FIG. 1 is a longitudinal cross-sectional view of a typical gas-insulated transmission line.
Figure 2:
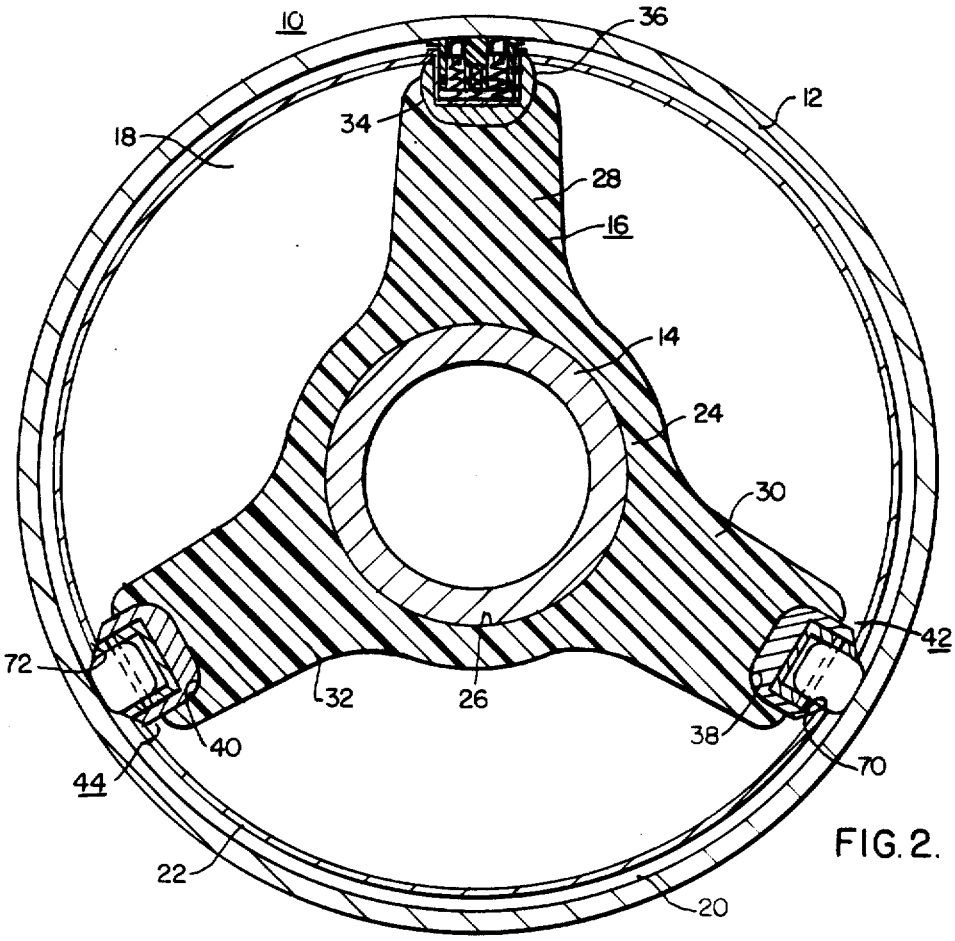
FIG. 2 is a cross-sectional view taken along line II—II of FIG. 1.

The gas-insulated transmission line 10 utilizing the teachings of this invention is illustrated in FIGS. 1 and 2. Therein, it is shown that the transmission line 10 is comprised of an elongated, cylindrical outer sheath 12, and an elongated inner conductor 14 disposed within, and spaced apart from, the outer sheath 12. The outer sheath 12 will typically be at low or ground electrical potential, whereas the inner conductor 14 will be at high electrical potential with respect to the outer sheath 12, and may typically carry voltages in the range 138–1200 KV. Insulatably supporting the inner conductor 14 within the outer sheath 12 are a plurality of supporting insulators 16, and electrically insulating the inner conductor 14 from the outer sheath 12 is an insulating gas 18 typical of which is sulfur hexafluoride at pressures of 50 pounds per square inch gauge. Providing low field regions 20 adjacent to the insulating spacers 16 are particle trapping rings 22. Apertures 21 in the rings 22 facilitate entry of particles into the low field regions 20. The inner conductor 14, the outer sheath 12, and the particle-trapping rings 22 will typically be of good electrically-conducting material such as aluminum.

Figure 6:
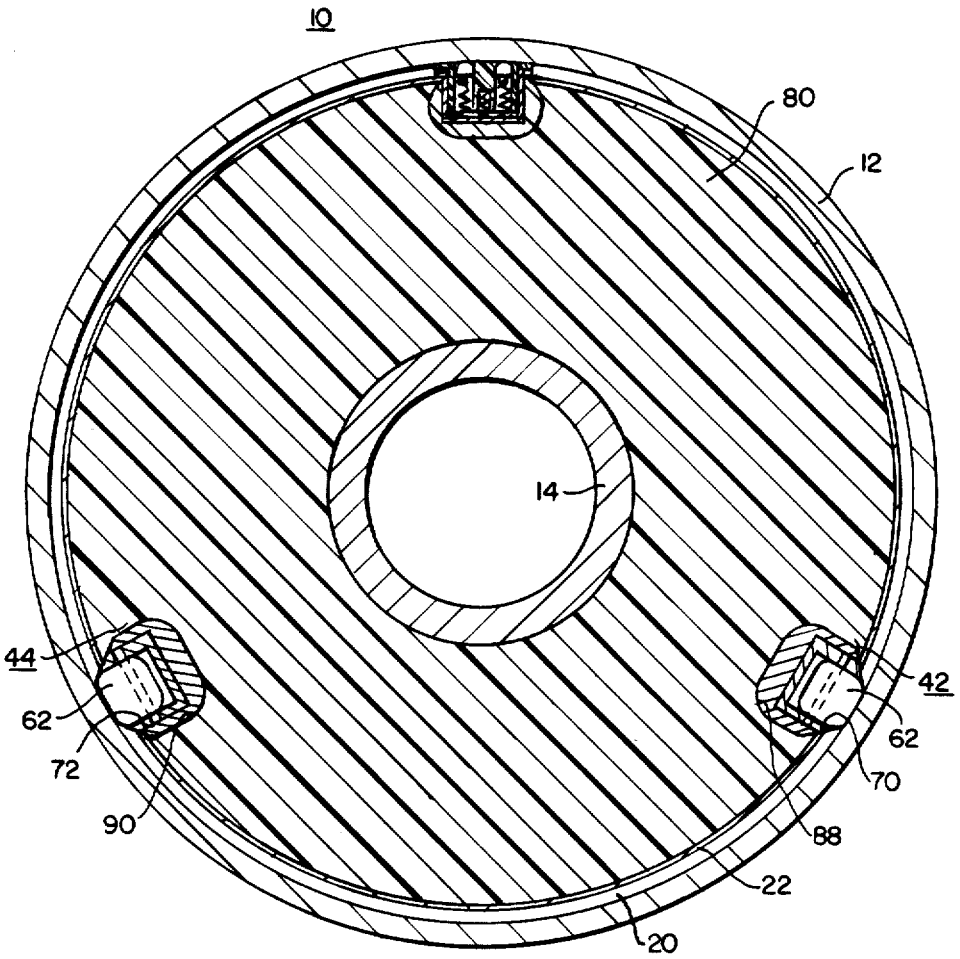
FIG. 6 is a modification of the view illustrated in FIG. 2.

As can be seen from FIG. 2, the insulating spacer 16 is preferably of a tri-post design, although the invention may be utilized with disc or conically-shaped insulators as illustrated in FIG. 6. The tri-post insulator 16 illustrated is comprised of a central portion 24 having a bore 26 therethrough through which extends the inner conductor 14. Extending outwardly from the central portion 24 to the particle trapping ring 22 are three legs 28, 30, 32. The leg 28 has an opening 34 therein in which is disposed a particle-trapping ring contact assembly 36, as is more fully described in U.S. Pat. No. 4,084,064, assigned to the same assignee as the present invention. The legs 30, 32 have openings 38, 40, respectively therein, and disposed within these openings 38, 40 are wheel assemblies 42, 44, respectively. The purpose of these wheel assemblies 42, 44 is to minimize abrasion and particle generation during assembly and thermal movement of the conductor and the insulators by replacing the sliding motion present in the prior art transmission lines with the rolling action of the wheel assemblies 42, 44. The use of such wheel assemblies 42, 44, which have lower coefficients of friction than for the prior art sliding means, simplifies assembly of longer lengths of transmission line 10 since lower insertion forces are required. Additionally, heavier conductors 14, for example, those utilized in 1200 KV systems, can be more easily assembled. By inserting the wheel assemblies 42, 44 within the legs 30, 32 of the support insulator 16, the assembly 42, for example, is contained within the grounded stress post of the insulator 16, thus minimizing further electrical stresses within the transmission line 10, and also minimizing the space required between the insulator 16 and the ouer sheath 12. Also to be noted is that the wheel assemblies 42, 44 are disposed within the legs 30, 32, respectively, which are in the lowermost portion of the outer sheath 12. As shown, the legs 30, 32 are disposed about 120° apart in the lowermost portion of the outer sheath 12, where the gravitational forces are most evenly distributed.

Figure 4:
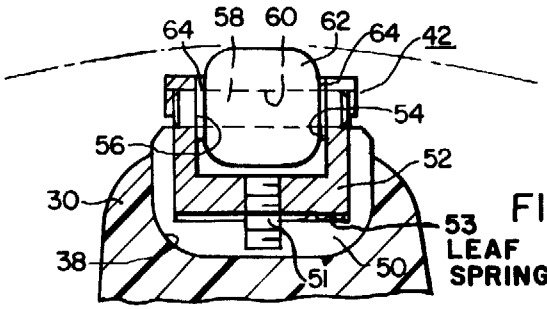
FIG. 4 is a detailed cross-sectional view of the wheel assembly.
Figure 3:
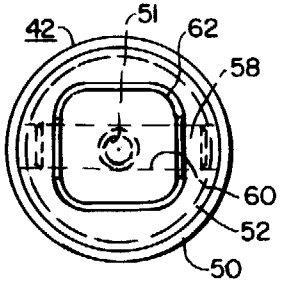
FIG. 3 is a detailed plan view of the wheel assembly.

Referring now to FIGS. 3 and 4, therein is shown in greater detail the wheel assembly 42 illustrated in FIGS. 2 and 6. Identical to the wheel assembly 42 shown is the wheel assembly 44 likewise illustrated in FIGS. 2 and 6. In FIG. 4, it can be seen that the opening 38 is provided in the leg 30 adjacent the outer sheath 12. Inserted within this opening 38 is a metallic insert 50, which typically would be cast into the leg 30 during the casting operation. Disposed within the insert 50, and fixedly secured thereto by means such as the screw 51, is the wheel holder cup 52. Although not a necessity, it may be desirable to provide a leaf spring 53 to provide electrical contact between the insert 50 and the wheel holder cup 52. Disposed within openings 54, 56 of the wheel holder cup 52, and being held thereto, is a wheel axle 58. The wheel axle 58 extends through a centrally disposed opening 60 of the wheel 62. The wheel 62 thus is free to rotate about the wheel axle 58. If desired, washers 64 may be utilized to space the wheel 62 from the wheel cup holder 52. The wheel 62 is preferably of a non-metallic material, so as to prevent the generation of conducting particles.

As can be seen from FIGS. 4 and 2, the wheel 62 extends outwardly of the leg opening 38, extends through a corresponding opening 70, 72 in the particle trapping ring 22, and is in contact with the outer sheath 12. The wheels 62 are rotatable in the elongated direction of the outer sheath 12, so that upon insertion of the inner conductor 14 with its associated spacers 16 into the outer sheath 12, the movement into the outer sheath 12 is facilitated by the rolling motion of the wheels 62. This simplifies insertion of the inner conductor 14 into the outer sheath 12, requires a lower insertion force to be exerted, and renders easier the assemblage of the heavier conductors utilized for the higher voltage rating systems.

Referring now to FIG. 6, it can be seen that the use of the wheel assemblies 42, 44 is not limited to tri-post support insulators, but instead may be utilized with disc or conically shaped insulators 80. In this modification with the disc-type insulator 80, which extends from the inner conductor 14 towards the outer sheath 12 to substantially fill in the cross-sectional area therebetween, there are a pair of circumferentially spaced-apart openings 88, 90 within the support insulator 80, and a wheel assembly 42, 44, respectively, similar in design to those previously described, is disposed within each opening 88, 90, with the respective wheels 62 extending through openings 70, 72 in the particle trapping ring 22 to contact the outer sheath 12. As before, the openings 88, 90 are preferably disposed in the lowermost portion of the support insulator 80 when the transmission line is in its final orientation so as to compensate for the effects of gravity.

Figure 5:
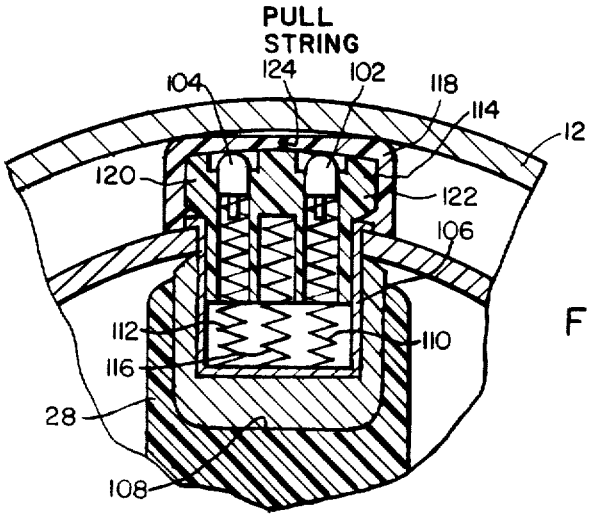
FIG. 5 is a detailed cross-sectional view of a system utilized to minimize particle generation from the particle trapping ring contact buttons.

Referring now to FIG. 5, therein is shown another means for minimizing the generation of conducting particles during manufacture of the transmission line 10, and more particularly at the time of insertion of the inner conductor 14 and its corresponding support insulators 16 into the outer sheath. As described in the aforementioned U.S. Pat. No. 4,084,064, it is desirable to provide a contact for maintaining electrical contact between the particle trapping ring 22 and the outer sheath 12 during energization of the transmission line 10. As was described in that patent, one or more contact buttons 102, 104 are disposed within a metallic cup 106 which in turn is secured within an opening 108 of one of the support legs 28 of the insulator 16. The contact buttons 102, 104 are biased by the springs 110, 112, and a spring holder 114 is likewise biased outwardly by a spring 116. During the time that the inner conductor 14 and the support insulator 16 is inserted into the outer sheath 12, the contact buttons 102, 104 rub against the outer sheath 12 and, because of the metallic nature of both the outer sheath 12 and the contact buttons 102, 104, conducting contamination particles can be generated. In order to minimize this particle generation, a non-metallic contact button cover 118, of a material such as nylon, is utilized to hold the contact buttons 102, 104 within the contact holder 114 and away from the outer sheath 12. As can be seen from the drawing, the contact button cover 118 is shaped in a dove-tail configuration over the lips 120, 122 of the contact button holder 114, so that the holder 118 is prevented from circumferentially moving with respect to the contact button holder 114. However, because of this dove-tail configuration, the contact button cover 118 can be longitudinally removed from the contact button holder 114. This removal of the contact button cover 118 from the contact button holder 114 can be accomplished, for example, by means such as the string 124.

As can be quite readily seen from the drawing and this description, the contact button cover 118 compresses the contact buttons 102, 104 and holds them in place within the contact button holder 114 through the dove-tail arrangements of the cover 118 and the holder 114. During assembly operations, the cover 118 is in place and the inner conductor 14 and its associated supports 16 are rolled into the outer sheath 12 on the wheels 62. Once inserted into the outer sheath 12 at its proper location, the string 124 previously attached to the cover 118 is pulled, sliding the cover 118 off the dove-tail groove thereby releasing the contact buttons 102, 104. In addition to making contact between the particle trapping ring 22 and the outer sheath 12, release of the contact buttons 102, 104 establishes electrical connection between the wheel assembly inserts 50 and the outer sheath via the springs 110 and 112, the metallic cups 106, the particle trapping ring 22, and the wheel holder cups 52. Hence, means for electrically connecting the wheel assembly inserts 50 with the outer sheath 12 is provided.

Thus, as can be seen, herein is described various means for minimizing the generation of contamination particles in gas-insulated transmission lines during the assembly operations of the transmission lines, and also during thermal expansion or contraction of the lines during energization of the transmission line.

I claim as my invention:

1. A gas-insulated transmission line of the type including a cylindrical outer sheath, an inner conductor disposed within said outer sheath, an insulating gas electrically insulating said inner conductor from said outer sheath, and support means for insulatably supporting said inner conductor within said outer sheath, said support means including a plurality of legs extending from said inner conductor towards said outer sheath, the improvement comprising:

at least one of said legs having an opening therein adjacent said outer sheath; and a wheel assembly disposed within said leg opening, said wheel assembly including a rotatable wheel extending outwardly of said leg opening and contacting said outer sheath, said wheel being rotatable only in the direction of said outer sheath elongation, said wheel assembly comprising an insert disposed in said leg opening and fixedly secured to said leg, a wheel holder cup disposed within said insert and secured thereto, said wheel, having a centrally disposed opening therethrough, disposed within said wheel holder cup, and a wheel axle extending through said wheel central opening and being held by said wheel holder cup.

2. A gas-insulated transmission line according to claim 1 wherein said support means includes three legs, two of which have openings therein, and a wheel assembly is disposed within each leg opening.

3. A gas-insulated transmission line according to claim 2 wherein said three legs are disposed about one hundred twenty degrees apart with one leg being oriented in the upper portion of said outer sheath, and said two lowermost legs have said openings therein.

4. A gas-insulated transmission line according to claim 1 wherein said wheel is of a non-metallic material.

5. A gas-insulated transmission line of the type including a cylindrical outer sheath, an inner conductor disposed within said outer sheath, an insulating gas electrically insulating said inner conductor from said outer sheath, and support means for insulatably supporting said inner conductor within said outer sheath extending from said inner conductor towards said outer sheath, the improvement comprising:

said support means having a pair of circumferentially spaced-apart openings therein; and a wheel assembly disposed within each of said support means openings, each wheel assembly including a rotatable wheel extending outwardly of a respective support means opening and contacting said outer sheath, each wheel being rotatable only in the direction of said outer sheath elongation, each wheel assembly comprising an insert disposed in a respective support means opening and fixedly secured to said support means, a wheel holder cup disposed within said insert and secured thereto, said wheel, having a centrally disposed opening therethrough, disposed within said wheel holder cup, and a wheel axle extending through said wheel central opening and being held by said wheel holder cup.

6. A gas-insulated transmission line according to claim 5 wherein each wheel is of a non-metallic material.

7. A gas-insulated transmission line of the type including a cylindrical outer sheath, an inner conductor disposed within said outer sheath, an insulating gas electrically insulating said inner conductor from said outer sheath, support means for insulatable supporting said inner conductor within said outer sheath, a particle trapping ring disposed adjacent said supporting means and spaced-apart from said outer sheath, and a contact assembly including a spring-biased contact button disposed within said support means and extending outwardly to said outer sheath, said contact button providing an electrical connection between said outer sheath and said particle trapping ring, the improvement comprising:

a non-metallic contact button cover longitudinally-removably secured to said contact assembly; and means for longitudinally removing said contact button cover from said contact assembly.

8. A gas-insulated transmission line of the type including a cylindrical outer sheath, an inner conductor disposed within said outer sheath, an insulating gas electrically insulating said inner conductor from said outer sheath, and support means for insulatably supporting said inner conductor within said outer sheath, said support means including a plurality of legs extending from said inner conductor towards said outer sheath, the improvement comprising:

at least one of said legs having an opening therein adjacent said outer sheath;

a wheel assembly disposed within said leg opening, said wheel assembly including a rotatable wheel extending outwardly of said leg opening and contacting said outer sheath, said wheel asssembly comprising a metallic insert disposed in said leg opening and fixedly secured to said leg, a wheel holder cup disposed within said insert and secured thereto, said wheel, having a centrally disposed opening therethrough, disposed within said wheel holder cup, and a wheel axle extending through said wheel central opening and being held by said wheel holer cup; and means electrically connecting said wheel assembly insert and said outer sheath.

9. A gas-insulated transmission line of the type including a cylindrical outer sheath, an inner conductor disposed within said outer sheath, an insulating gas electrically insulating said inner conductor from said outer sheath, and support means for insulatably supporting said inner conductor within said outer sheath extending from said inner conductor towards said outer sheath, the improvement comprising:

said support means having a pair of circumferentially spaced-apart openings therein;

a wheel assembly disposed within each of said support means openings, each wheel assembly including a rotatable wheel extending outwardly of a respective support means opening and contacting said outer sheath, each wheel assembly comprising a metallic insert disposed in a respective support means opening and fixedly secured to said support means, a wheel holder cup disposed within said insert and secured thereto, said wheel, having a centrally disposed opening therethrough, disposed within said wheel holder cup, and a wheel axle extending through said wheel central opening and being held by said wheel holder cup; and means electrically connecting each wheel assembly insert and said outer sheath.

*10. A gas-insulated transmission line of the type including a cylindrical outer sheath, an inner conductor disposed within said outer sheath, an insulating gas electrically insulating said inner conductor from said outer sheath, and support means for insulatably supporting said inner conductor within said outer sheath, said support means including a plurality of legs extending from said inner conductor towards said outer sheath, the improvement comprising:*

*at least one of said legs having an opening therein adjacent said outer sheath;*

*a metallic insert disposed in said leg opening and fixedly secured to said leg, rolling means disposed within said metallic insert and extending outwardly contacting said outer sheath; and*

*means electrically connecting said metallic insert and said outer sheath.*

*11. A gas-insulated transmission line of the type including a cylindrical outer sheath, an inner conductor disposed within said outer sheath, an insulating gas electrically insulating said inner conductor from said outer sheath, and support means for insulatably supporting said inner conductor within said outer sheath extending from said inner conductor towards said outer sheath, the improvement comprising:*

*said support means having a pair of circumferentially spaced-apart openings therein;*

*a metallic insert disposed in each support means opening and fixedly secured to said support means, rolling means disposed within each said metallic insert and extending outwardly contacting said outer sheath; and*

*means electrically connecting each metallic insert and said outer sheath.*

* * * * *